No. 883,100. PATENTED MAR. 24, 1908.
F. DÜMMIG.
FISHING REEL.
APPLICATION FILED DEC. 19, 1907.
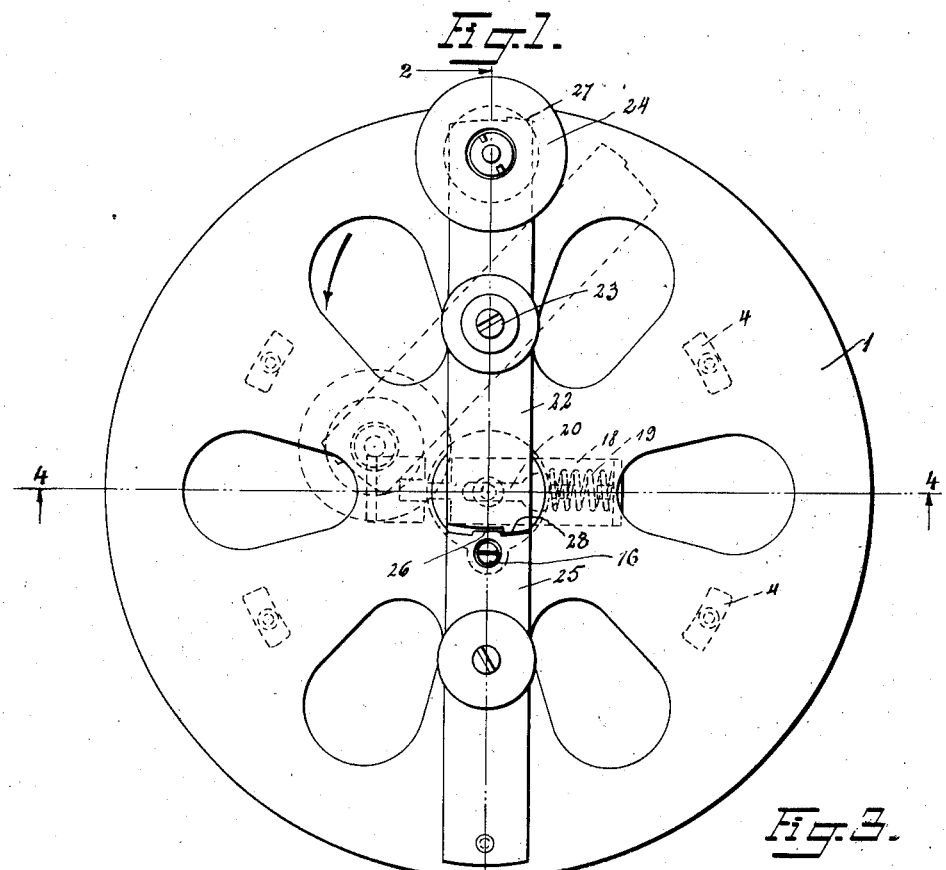
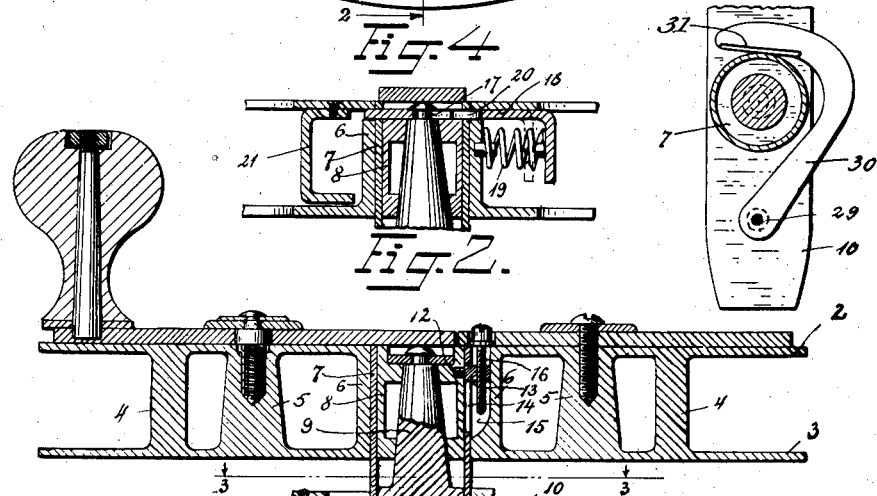
Witnesses: Inventor
By his Attorney

UNITED STATES PATENT OFFICE.

FELIX DÜMMIG, OF NEW YORK, N. Y.

FISHING-REEL.

No. 883,100.　　　Specification of Letters Patent.　　Patented March 24, 1908.

Application filed December 19, 1907. Serial No. 407,194.

*To all whom it may concern:*

Be it known that I, FELIX DÜMMIG, a subject of the German Emperor, and a resident of New York, county of New York, State of New York, have invented certain new and useful Improvements in Fish-Line Reels, of which the following is a specification.

The present invention pertains to fishline reels and has for its object to provide a construction that will render the fishing device more efficient than the hitherto used devices.

My invention is illustrated in the accompanying drawing in which similar reference letters denote corresponding parts and in which Figure 1 is a side view of the reel; Fig. 2 a vertical section on line 2—2 of Fig. 1; Fig. 3 a cross section on line 3—3 of Fig. 2, and Fig. 4 a cross section on line 4—4 of Fig. 1.

In the drawing, 1 denotes the reel which may be made of wood or metal, as aluminium or the like. When of the latter material the reel is cast in one piece, which consists of the side disks 2, 3 and the cross pieces 4 arranged in a circle and adapted to receive the fishline, the strengthening cross pieces 5, 5 and bearing 6.

7 denotes a steel bushing which is pressed into the bearing and projects with one end outwards. Slidably borne in this steel bushing is a metal bushing 8 that is adapted to bear the conical pivot 9 which projects from the base plate 10 holding the fishing pole 11. This double bushing serves the purpose to allow of the adjustment of the reel in accordance with the wear. To affect the adjustment a bolt 12 is secured in the inner end of the steel bushing 7, which bolt is provided with a head 13 that projects through a longitudinal slot 14 provided in the steel bushing, and rests in a longitudinal groove 15 made in the inner surface of the bearing 6. Working in the head 13 of the bolt 12 is a threaded pin 16 that projects outward from the bearing, and by the operation of which the inner metal bushing 8 can be displaced within the steel bushing 7 so as to tighten the parts after the same have slackened, owing to wear.

In order to allow of the pole being readily detached from the reel, which is required when the line becomes entangled between the said parts, I provide the following mechanism. The inner end of the pivot 9 is provided with a circular notch 17 which is normally engaged by a locking bar 18. The latter is actuated by a spring 19 tending to hold the parts in engagement, and is provided with a slot 20 embracing the notched end of the pin. Upon the depression of the said bar 18, the pivot 9 is unlocked and can be removed from the bushing 8.

21 designates a finger support to allow of an easier operation of the locking bar 18.

The handle for the rotation of the reel consists of a radial arm 22 pivoted in its center at 23 to the reel and carrying at one of its ends a knob 24. Diametrically with this swinging arm 22 a bar 25 is stationarily applied to the reel and is provided with a central projection 26, both sides of which are to serve as stops for the swinging arm which at each end has lateral projections 27, 28, either of which coöperates with the central projection of the stationary bar, to limit the swinging movement of the arm 22.

To operate the reel for winding up the fishline the handle is turned around its pivot at 180° so that its knob, which normally is in the center of the reel, is brought to the circumference of the reel. Pivoted at 29 to the base plate 10 is a hook shaped arm 30 having a wear plate 31, and which, in swinging toward the outwardly projecting portion of the steel bushing 7 is adapted with said plate to frictionally engage the latter, so as to serve as a brake for the reel.

What I claim and desire to secure by Letters Patent is:—

1. In a fishline reel, the combination with the base plate, of a stationary bushing, an adjustable bushing slidably borne in the first bushing, a conical pivot borne in said adjustable bushing, and projecting from the base plate, means for the adjustment of the movable bushing upon the conical pivot to tighten the parts, and means for locking the said pivot to the stationary bushing, substantially as set forth.

2. In a fishline reel, the combination with the base plate, of a stationary bushing, an adjustable bushing slidably borne therein, a recessed conical pivot borne in said adjustable bushing and projecting from the base plate, means for the adjustment of the movable bushing, and a spring actuated locking bar engaging with the recessed end of the conical pivot to lock the latter in position, substantially as set forth.

3. In a fishline reel, the combination with the base plate, of a stationary bushing, one end of which projects outward from the reel, an adjustable bushing therein, a recessed conical pivot borne in said movable bushing and projecting from the base plate, and a hook shaped arm pivoted to the latter and adapted, when swung against the stationary bushing, to frictionally engage the latter so as to act as a brake, substantially as set forth.

4. In a fishline reel, a handle consisting of a radial bar pivoted at its center to the reel, a knob at one end thereof which normally is adapted to rest over the center of the reel and by swinging the handle is brought to the circumference of the reel, and means for limiting the swinging movement of the handle, substantially as set forth.

Signed at New York this 17th day of December, 1907.

FELIX DÜMMIG.

Witnesses:
    MAX D. ORDMANN,
    ROBERT STRAHL.